(12) United States Patent
Greenberger et al.

(10) Patent No.: US 10,531,154 B2
(45) Date of Patent: Jan. 7, 2020

(54) VIEWER-RELATION BROADCASTING BUFFER

(71) Applicant: International Business Machines Corporation, Armonk, NY (US)

(72) Inventors: Jeremy A. Greenberger, San Jose, CA (US); Lisa Seacat DeLuca, Baltimore, MD (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/994,654

(22) Filed: May 31, 2018

(65) Prior Publication Data
US 2019/0373319 A1   Dec. 5, 2019

(51) Int. Cl.
| H04N 7/16 | (2011.01) |
| H04N 21/454 | (2011.01) |
| H04N 21/4545 | (2011.01) |
| H04N 21/458 | (2011.01) |
| H04N 21/45 | (2011.01) |
| H04N 21/466 | (2011.01) |
| H04H 20/10 | (2008.01) |

(52) U.S. Cl.
CPC ....... *H04N 21/4542* (2013.01); *H04N 21/458* (2013.01); *H04N 21/4508* (2013.01); *H04N 21/45457* (2013.01); *H04H 20/103* (2013.01); *H04N 21/4667* (2013.01)

(58) Field of Classification Search
None
See application file for complete search history.

(56) References Cited

U.S. PATENT DOCUMENTS

| 4,930,160 | A |   | 5/1990 | Vogel | |
| 6,141,488 | A | * | 10/2000 | Knudson | H04N 5/782 |
| | | | | | 386/292 |
| 6,850,252 | B1 | * | 2/2005 | Hoffberg | G06K 9/00369 |
| | | | | | 348/E7.061 |

(Continued)

OTHER PUBLICATIONS

"AgriLife Extension Social Media Guidelines", Texas A&M, Dec. 2017, pp. 1-7.

(Continued)

*Primary Examiner* — William J Kim
(74) *Attorney, Agent, or Firm* — Peter J. Edwards

(57) ABSTRACT

A method for censoring a broadcast includes sending a notification that viewing content is being recorded by a broadcaster and available for viewing. They method also includes identifying one or more viewers that have accepted the notification and identifying the one or more viewer's viewers' relationship level to the broadcaster. The method also includes generating a buffer for the viewer. The method also includes determining a sensitive content occurrence frequency of the broadcaster and adjusting the buffer length based on the relationship level for the viewer. The method also includes parsing the broadcast of the broadcaster to identify sensitive viewing content, and, in response to a determination that the sensitive viewing content exceeds the viewer's relationship level, censoring the sensitive viewing content based on the adjusted buffer length of a buffered version of the broadcast transmitted to the viewer.

20 Claims, 6 Drawing Sheets

(56) References Cited

U.S. PATENT DOCUMENTS

| | | | | |
|---|---|---|---|---|
| 7,999,728 | B2 * | 8/2011 | Chen | G06Q 30/02 342/357.25 |
| 8,949,724 | B2 * | 2/2015 | Hickman | G06Q 30/02 715/753 |
| 9,223,986 | B2 | 12/2015 | Ashok | |
| 9,473,809 | B2 | 10/2016 | Fan | |
| 9,607,656 | B1 * | 3/2017 | Serce | G11B 27/11 |
| 10,063,600 | B1 * | 8/2018 | Marsh | H04L 65/1089 |
| 2003/0110514 | A1 * | 6/2003 | West | H04N 5/76 725/134 |
| 2006/0005218 | A1 * | 1/2006 | Kroeger | H04H 20/106 725/28 |
| 2006/0256959 | A1 * | 11/2006 | Hymes | H04M 1/26 379/433.04 |
| 2008/0049027 | A1 * | 2/2008 | Hauke | H04N 7/163 345/502 |
| 2008/0104225 | A1 * | 5/2008 | Zhang | H04L 67/36 709/224 |
| 2010/0011336 | A1 * | 1/2010 | Muller | G06F 8/60 717/100 |
| 2010/0146118 | A1 * | 6/2010 | Wie | H04L 67/306 709/225 |
| 2010/0250703 | A1 * | 9/2010 | Steadman | G11B 27/034 709/217 |
| 2011/0126223 | A1 * | 5/2011 | Shahraray | H04N 21/44218 725/28 |
| 2011/0153328 | A1 * | 6/2011 | Lim | G10L 17/26 704/251 |
| 2012/0117584 | A1 * | 5/2012 | Gordon | H04N 21/254 725/19 |
| 2012/0131610 | A1 * | 5/2012 | Fernandez Gutierrez | H04N 21/23424 725/34 |
| 2012/0192225 | A1 | 7/2012 | Harwell | |
| 2013/0086159 | A1 * | 4/2013 | Gharachorloo | G06Q 50/01 709/204 |
| 2013/0332545 | A1 | 12/2013 | Primus | |
| 2014/0109185 | A1 * | 4/2014 | Burke | G06Q 50/01 726/4 |
| 2014/0195647 | A1 * | 7/2014 | Chen | H04L 67/10 709/219 |
| 2014/0297740 | A1 * | 10/2014 | Narayanan | H04L 67/306 709/204 |
| 2014/0350935 | A1 * | 11/2014 | Schuster | G10L 15/08 704/251 |
| 2015/0379989 | A1 * | 12/2015 | Balasubramanian | G06Q 30/0255 704/233 |
| 2016/0094501 | A1 * | 3/2016 | Lee | H04L 51/32 709/206 |
| 2016/0253710 | A1 * | 9/2016 | Publicover | H04W 4/21 705/14.66 |
| 2017/0140249 | A1 * | 5/2017 | Lee | G06K 9/00677 |
| 2019/0099653 | A1 * | 4/2019 | Wanke | A63B 71/06 |
| 2019/0116102 | A1 * | 4/2019 | Harb | H04L 43/08 |

OTHER PUBLICATIONS

"Child Safety Online | A Practical Guide for Providers of Social Media and Interactive Services", UK Council for Child Internet Safety (UKCCIS), Last printed Mar. 19, 2018, 60 pages, <https://www.gov.uk/government/uploads/system/.../ukccis_guide-final__3_.pdf>.

"Cognitive time-based media content extraction and sharing on SNS", An IP.com Prior Art Database Technical Disclosure, Disclosed Anonymously, IP.com No. IPCOM000251447D, IP.com Electronic Publication Date: Nov. 2, 2017, 3 pages.

"Social Media Policy | Media Policy—400 Thunder Journalist, Photographer and Assorted Media Social", Introduced Oct. 2016, pp. 1-4.

"Synchronized Filter, Record and Playback of Data Streams Contingent on Topic Embargos", An IP.com Prior Art Database Technical Disclosure, Disclosed Anonymously, IP.com No. IPCOM000236259D, IP.com Electronic Publication Date: Apr. 15, 2014, 5 pages.

Furtado, Andrew, "Media-Specific Micro-Updates", An IP.com Prior Art Database Technical Disclosure, Original Publication Date: Apr. 2, 2012, IP.com No. IPCOM000216359D, 6 pages.

Killham, Evan, "Keep your kids 'safe' and remove swear words from Apple Music", Cult of Mac, Jul. 2, 2015, 6 pages, <https://www.cultofmac.com/327969/how-to-remove-swears-from-apple-music/>.

Constine, "Facebook explains censorship policy for live video," Printed Aug. 6, 2019, 14 pages https://web.archive.org/web/20160709135743/https://techcrunch.com/2016/07/08/facebook-censorship-policy/.

* cited by examiner

VIEWER-RELATION BROADCASTING BUFFER

BACKGROUND

The present invention relates to machine learning, and more specifically, generating a personalized viewing buffer from one or more inputs based on an established viewer-broadcaster relationship level.

SUMMARY

Aspects of the present disclosure are directed to a method for censoring a broadcast. The method can comprise sending a notification that viewing content is being recorded by a broadcaster and available for viewing. The method can further comprise identifying one or more viewers that have accepted the notification. The method can further comprise identifying the one or more viewer's relationship level to the broadcaster and generating a buffer for the viewer. Generating can include determining a sensitive content occurrence frequency of the broadcaster and adjusting the buffer length based on the relationship level for the viewer. Lastly, the method can comprise parsing the broadcast of the broadcaster to identify sensitive viewing content and in response to a determination that the sensitive viewing content exceeds the viewer's relationship level, censoring the sensitive viewing content based on the adjusted buffer length of a buffered version of the broadcast transmitted to the viewer.

Aspect of the present disclosure are further directed to a system for censoring a broadcast. The system can comprise a computer readable storage medium configured to store instructions, a user interface configured to receive input and present output and a processor communicatively coupled to the computer readable storage medium and to the user interface. The instructions can be configured to send a notification that viewing content is being recorded by a broadcaster and available for viewing. The instructions can be further configured to identify one or more viewers that have accepted the notification. The instructions can be further configured to identify the one or more viewer's relationship level to the broadcaster and to generate a buffer for the viewer. Generating can include determining a sensitive content occurrence frequency of the broadcaster and adjusting the buffer length based on the relationship level for the viewer. Lastly, the instructions can be configured to parse the broadcast of the broadcaster to identify sensitive viewing content and in response to a determination that the sensitive viewing content exceeds the viewer's relationship level, the instructions can be configured to censor the sensitive viewing content based on the adjusted buffer length of a buffered version of the broadcast transmitted to the viewer.

Aspects of the present disclosure are further directed to a computer program product for censoring a broadcast. The computer program product comprises a computer readable storage medium having program instructions embodied therewith, the program instructions, executable by a processor. The program instructions can cause the processor to send a notification that viewing content is being recorded by a broadcaster and available for viewing. The program instructions can further cause the processor to identify one or more viewers that have accepted the notification. The program instructions can further cause the processor to identify the one or more viewer's relationship level to the broadcaster and to generate a buffer for the viewer. Generating can include determining a sensitive content occurrence frequency of the broadcaster and adjusting the buffer length based on the relationship level for the viewer. Lastly, the program instructions can cause the processor to parse the broadcast of the broadcaster to identify sensitive viewing content and in response to a determination that the sensitive viewing content exceeds the viewer's relationship level, the program instructions can further cause the processor to censor the sensitive viewing content based on the adjusted buffer length of a buffered version of the broadcast transmitted to the viewer.

BRIEF DESCRIPTION OF THE DRAWINGS

The drawings included in the present application are incorporated into, and form part of, the specification. They illustrate embodiments of the present disclosure and, along with the description, explain the principles of the disclosure. The drawings are only illustrative of certain embodiments and do not limit the disclosure.

Figure 1:
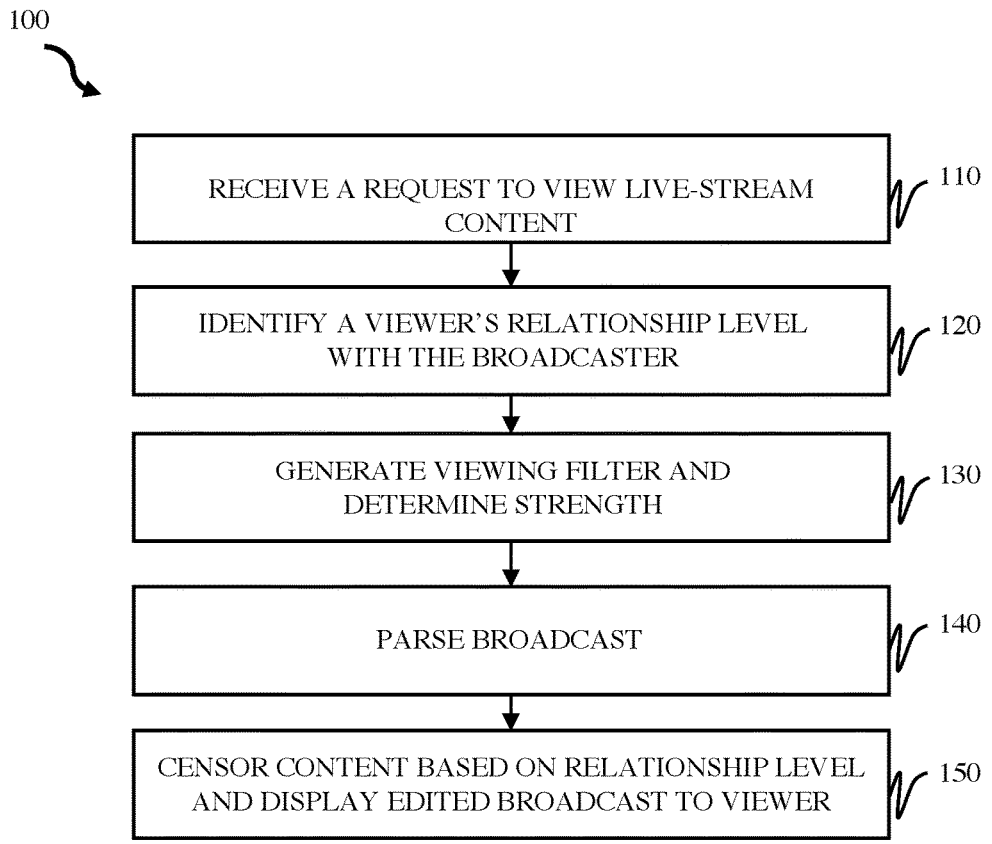
FIG. 1 illustrates a flowchart of an example method for censoring a broadcast with a viewing buffer in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the embodiments described. On the contrary, the intention is to cover all modifications, equivalents, and alternatives falling within the spirit and scope of the present disclosure.

DETAILED DESCRIPTION

Aspects of the present disclosure relate generally to the field of natural language processing, and more particularly, to social and collaborative computing. While the present disclosure is not necessarily limited to such applications, various aspects of the disclosure may be appreciated through a discussion of various examples using this context.

Aspects of the present disclosure relate to automatically generating a broadcasting censorship viewer buffer based on the relationship level between a broadcaster and an individual viewer. Viewing buffers can limit offensive content and provide appropriate language and visual content censorship when broadcasting to a wide variety of viewers. Although not limited to such applications, an understanding of some embodiments of the present disclosure may be improved given the context of natural language processing.

A broadcaster (e.g., recording-end user) of a live-stream recording device (e.g., smartphone, mobile phone, tablet, smart television, computer, laptop, desktop, etc.) may possess, or have access to, a social media broadcasting platform (e.g., FACEBOOK LIVE, INSTAGRAM LIVE, SNAPCHAT MY STORY, PERISCOPE, etc.) in which they wish to share and/or broadcast a live-stream to active friends within their social connection network, hereinafter referred to as viewers, at the viewing-end of a remote live-stream receiving device (e.g., smartphone, mobile phone, tablet, smart television, computer, laptop, desktop, etc.). However, content shared by the broadcaster may not be appropriate, depending on which viewers may be present, depending on the topic of conversation, and further depending on the tone of the conversation. In other words, a broadcaster may wish to initiate a live-stream broadcast but use personalized censors to each viewer viewing the broadcast based on its appropriateness. During a broadcast, the broadcaster may simultaneously not wish certain gestures or phrases be viewed by certain viewers. Rather than blocking the viewer entirely, the broadcaster can choose to delay, edit, and/or remove segments of auditory and visual information to designated viewers based on their relationship level. For example, if one viewer of the broadcast is the broadcaster's boss and the broadcaster accidently broadcasts negative content towards their employing company, the negative content may be retroactively removed from the stream before the stream is received on the boss's viewer end stream. In another example, if a broadcast comprises two or more viewers, one content feed on the viewer-end may be restricted whereas an alternate viewer, subscribing to the same broadcast as the restricted viewer, may receive the full audio and visual content form the broadcaster's stream based on their close personal relationship to the broadcaster. Traditional censorship requires the plurality of viewers to be subjected to the same editing. Each viewing buffer is applied to the entirety of viewers. In embodiments, using a plurality of personal and professional inputs established from viewer profiles in associated social media broadcasting platforms, a viewer profile relationship level is established between the broadcaster and the viewer, with all viewing buffers (e.g., viewing buffer) applied on a level-by-level determination.

In embodiments, machine learning techniques may be employed throughout social and collaborative broadcasting. Broadcasting inputs may be processed and transformed into machine-readable data to allow the device to understand the topic of any inappropriate and/or offensive behavior, and gesture. The result of machine learning processing can enable a viewing buffer during inappropriate comments and gestures of the live-stream content broadcast.

Some embodiments of the present disclosure relate to natural language processing (NLP) and NLP annotators. NLP annotators identify inappropriate and offensive annotations. In embodiments, an example of a machine learning annotator is WATSON NATURAL LANGUAGE UNDERSTANDING (NLU). Although not limited to such an annotator, an understanding of some embodiments of the present disclosure may be improved given the context of the annotator. The live-stream recording device may further employ linguistic analysis (e.g., via IBM WATSON ALCHEMY LANGUAGE) of the broadcast to determine whether censorship is required for a particular viewer. In some embodiments, linguistic analysis can parse the content, sentiment, and tone of a broadcaster's broadcast.

A viewing buffer can cause a remote live-streaming receiving device to receive an edited broadcast. The viewing buffer can be a predetermined buffer length set by the broadcaster or a length determined by the relationship level of the broadcaster and user. In embodiments, the viewing buffer may be included as part of the original broadcast or retroactively applied through a gesture or voice command.

Referring now to the figures, FIG. 1 illustrates a flowchart of an example method 100 for censoring a broadcast with a viewing buffer in accordance with some embodiments of the present disclosure. The method 100 can be performed by, for example, one or more processors, a social media application or a different configuration of hardware.

In embodiments, the method 100 begins with operation 110. For purposes of explanation, the method 100 will be described as performed in a live-stream recording device (e.g., mobile phone) by a social media broadcasting software application, hereinafter referred to as a social media application, comprising high-level front-end and back-end processing architecture. However, the method 100 can be performed by other hardware components or combinations of hardware components. For example, in some embodiments, the social media application can be used to acquire data from a user used in method 100 and then communicate the acquired data to a remote server for completion of analysis and verification processes of method 100 based on the data acquired by the social media application.

In operation 110, one or more viewers (e.g., followers, contacts, etc.) shared on the social media broadcasting platform, receive a request to view live-stream content. A request to view live-stream content can comprise sending a notification that live content, broadcasted by a broadcaster, is available for viewing. Live-stream content is initiated by the broadcaster and transferred, via a network, from the broadcaster recording device to one or more remote live-stream receiving devices operated by one or more viewers. Transferring is initiated with viewer approval. In embodiments, approval can be established by a viewer initiated operation to view to the live-stream content. Subscribing can include indicating by an applied action force (e.g., pressing, clicking, swiping) on the user interface of the live-stream receiving device to receive (e.g., follow, join in, enter) the live-stream content captured by the broadcasters recording device. Live-stream content refers to media that uses streaming media technologies for creating networks of live multimedia shared among the viewers. Live-stream content can include coverage of the broadcaster's daily activities and/or attendance at event (e.g., concerts) and/or serve as a medium of marketing for product promotion. In embodiments, for example, a broadcaster can choose to live-record himself giving a motivational speech through the social media application. While initially intending to use the social media application on their respective live-stream receiving device for alternative purposes (e.g., check emails, make phone call, etc.), a viewer can see, through a notification, the broadcaster has begun a live broadcast. The notification can comprise texts, graphics, sounds, and/or other notifications. The viewer can then choose, by pressing the notification, to watch the broadcaster's broadcast.

In operation 120, the social media application can identify the respective viewer-to-broadcaster relationship level between each viewer and the broadcaster and further determine their respective degree of separation (e.g., $1^{st}$, $2^{nd}$, $n^{th}$). In embodiments, the social media application extracts a plurality of inputs associated with each viewer's identity and the broadcaster's identity, to establish a relationship profile. Inputs can comprise metadata associated with each user's (e.g., broadcaster, viewer) account settings and contact information established when each user registered for an account on the social media platform. The social media application, running locally on the broadcasters recording device, then matches the plurality of inputs of the viewer against the broadcaster. The relationship level is then determined and categorized by the number of overlapping inputs.

The relationship level is the formal analysis of inputs, accomplished by input matching, resulting in an identifiable type of friendship representation (e.g., casual, close, etc.) shared between a single viewer and the broadcaster. Matching, for example, the overlapping metadata between personal and professional input data, an appropriate relationship level can be identified. Operation 120 is described in more detail hereinafter with respect to FIG. 2.

In response to the identified relationship level established in operation 120 for each of the one or more viewers subscribed to receive and view the live-stream content, operation 130 generates a viewing buffer personalized to each of the one or more viewers. In embodiments, the personalized viewing buffer has a content dependent strength reflected by a length of delay (e.g., seconds, minutes) the receiving content is edited and displayed by, at the viewer end. The content dependent strength determines the specific delay associated with each personalized viewing buffer, to enable the editing, on the viewer end, of the receiving sensitive content. Using one or more natural language processors (described in more detail with respect to operation 140), operation 130 determines the occurrence frequency at which the broadcaster speaks or visually gestures sensitive content.

The occurrence frequency at which the broadcaster displays or initiates sensitive content can be based upon rate or duration of time in which explicit actions and/or comments are initiated throughout the content duration of the broadcaster's live-stream.

Sensitive content can include, but is not limited to, offensive language or otherwise hurtful, derogatory or obscene comments made by the broadcaster about another person, an obscene gesture or otherwise movement or position of the body, especially of the hands or arms, that is considered offensive or vulgar in some particular cultures, and/or privileged or proprietary information whereas if compromised through alteration, corruption, loss, misuse, or unauthorized disclosure, could cause serious harm to the broadcaster.

In operation 140, the social media application can parse the broadcasters live-stream broadcast for sensitive viewing content. Parsing analyzes the broadcaster's auditory sentence structure and identifies each word's semantic role. In embodiments, the social media applications can use one or more natural language processor to evaluate the linguistic content (e.g., subject), sentiment (e.g., attitude, feeling, emotion), and tone (e.g., pitch), of the broadcaster's broadcast to find sensitive viewing content. Operation 140 is described in more detail hereinafter with respect to FIG. 3.

In response to a determination that sensitive content occurs in the broadcast and occurs at a rate determined to be beyond an acceptable viewer-to-broadcaster relationship level generated in operation 120, operation 150 blocks the sensitive viewing content from the viewer. Blocking hides the sensitive viewing content from a viewer whose relationship level is determined to be below the allowable sensitive content. In embodiments, blocking enables the viewing buffer and is further achieved by editing the live-stream content to remove (e.g., delete) content from the viewers' feeds on their live-stream receiving devices. For example, if 5 seconds of sensitive viewing content is blocked from the viewer, the viewing content skips over the 5 seconds of sensitive viewing content. Blocking occurs at the broadcaster end such that the broadcaster can send multiple copies of the viewing content. Viewing content is relationship level dependent and alternative variations of the live-stream content can be transferred to one or more viewer devices. Operation 150 can be described in more detail hereinafter with respect to FIG. 3.

In alternative embodiments, using the existing capabilities of the user device, the broadcaster can alternatively choose to initiate, through a gesture (e.g., eye flicker, hand wave, sign language) or voice command (e.g., "use buffer") to indicate and/or retroactively apply, the viewing buffer for a previous duration of time in the broadcast. The viewing buffer can further delay delivery of the live-stream broadcast which enables time for the editing, either automatic or manual, to occur. In doing so, the broadcaster can remove any offensive or inappropriate as well as language that may comprise a surprise for a subscribed viewer. For example, a broadcaster may mistakenly, with a birthday viewer present, tell viewers details on an upcoming surprise birthday party for the birthday viewer. Quickly realizing their mistake, the broadcaster can signal by signing to stop and request to hide the previous twenty seconds of content to the birthday viewer. The hidden content will be deleted, and the birthday viewer will only see edited live-stream content. Assuming the broadcasting content is satisfactory for their identified relationship level, content transferred to one or more other viewer receiving devices will be unedited.

FIG. 1 is intended to represent the example operations of an example method for censoring a broadcast using a viewing buffer in accordance with some embodiments of the present disclosure. In some embodiments, however, individual operations can have greater or lesser complexity than shown in FIG. 1, and operations in addition to (or in substitution of) those shown in FIG. 1 can be present. Furthermore, in some embodiments, various operations illustrated in FIG. 1 can have greater, lesser, or different functionality than shown in FIG. 1. Furthermore, in some embodiments, various operations illustrated in FIG. 1 can occur in different orders, if they occur at all.

Figure 2:
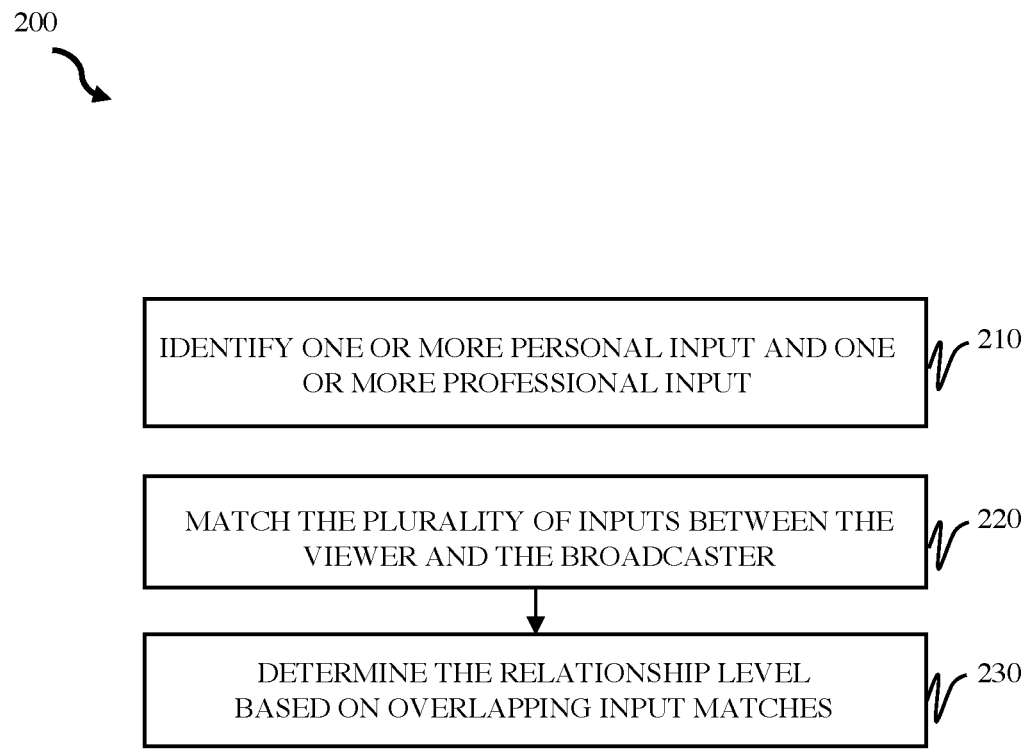
FIG. 2 illustrates a flowchart of an example method for identifying a viewer's relationship level with a broadcaster in accordance with some embodiments of the present disclosure.

Referring now to FIG. 2, illustrated is a flowchart of an example method 200 for identifying a viewer's relationship level with a broadcaster according to some embodiments of the present disclosure. The method 200 can be performed by, for example, one or more processors executing an application, such as a social media application, or a different configuration of hardware. For clarity, the method 200 will hereinafter be described as being performed by the social media application residing on the broadcaster's device. However, as with method 100, aspects of the method 200 can be performed by other hardware components or combinations of hardware components. In some embodiments, the method 200 is a sub-method of operation 120 of FIG. 1.

In operation 210, a social media application system identifies a plurality of inputs comprised in the account profile of both the broadcaster and each of one or more viewers that have subscribed to or otherwise receive live-stream content from the broadcaster. In order to initiate viewing content or subscribe to a broadcast, a viewer creates a user profile in the social media broadcasting platform. In embodiments, the user profile is a summative representation and visual display of personal data associated with a specific user (e.g., broadcaster, viewer 1, viewer 2). More specifically, the user profile refers to the explicit digital representation of the user's identity. In embodiments, the plurality of inputs can comprise the user's identity. Background information of the user can be exploited by the social media application system to establish common characteristics and preferences shared by the broadcaster and each of the one or more viewers. For example, the plurality of inputs can comprise one or more personal inputs and one or more professional inputs.

Hereinafter, with respect to operation 210, the phrase "the user's" can refer to the combination of inputs relating to the viewer and/or to the combination of inputs relating to the broadcaster. Personal inputs relate to the user's preference and include, but are not limited to, one or more inputs regarding the user's age (e.g., 20's, 30's), the user's gender (e.g., male, female), the user's geographical location (e.g., city in which they call home), the user's previously documented interactions (e.g., the shared number of uploaded images, etc.), the user's number of mutual friends, and the user's indicated interests (e.g., sports, activities, etc.). Professional inputs relate to career oriented experiences and include, but are not limited, one or more inputs regarding, the length of the virtual relationship between the broadcaster and the viewer (e.g., months, years, etc.), the type of relationship (e.g., friend, family, coworker, etc.), the user's past and present career (e.g., career type, career location, career duration, etc.), and the user's education (e.g., degree received, school attended). In some embodiments, various personal inputs can be classified as professional inputs and various professional inputs can be classified as personal inputs, if they exist at all.

In operation 220, the social media application retrieves the inputs from the associated user profiles of the broadcaster and each of the one or more viewers identified in operation 210. In operation 220, the plurality of inputs is retrieved from a database associated with storing information relevant to each registered user profile on the social media broadcasting platform. In some embodiments, for each respective viewer, after compiling an average representation of inputs for the viewer, operation 220 matches the average representation of inputs for the viewer against an average representation of inputs for the broadcaster.

Overlapping inputs (inputs identical between the broadcaster and viewer) from the plurality of inputs are mined to create high level parameters that define each relationship level. Each input is used to determine the familiarity the respective viewer has with the broadcaster. For example, by measuring the overlapping inputs, the social media application establishes a baseline for determining the familiarity a broadcaster with the respective viewer. Additionally, overlapping inputs can be within a broadcaster-set deviation, such that a statistical average of matching inputs can be quantifiably measured, based on, but not limited to, time, quantity, and relation. Various conventional methods to match a viewer's plurality of inputs against the broadcaster's plurality of inputs can be implemented.

In some embodiments, the social media application can extract an input set representing each commonality (e.g., age, location, profession) shared between the respective viewer and broadcaster. Once an input set is established, the social media application can use recently added inputs to establish a match score.

In some embodiments, using a template matching approach, the social media application can use a copy of the respective viewer's inputs for which to trace against the inputs of the broadcaster, so to physically overlay each input as to identity similarities.

In some embodiments, using a statistical approach, the mobile application can calculate the relation and deviation between two or more input data points and establish correlation coefficients. Each coefficient can be weighted to determine the divergence of similarity.

In operation 230, the relationship level for each viewer is identified based on a determined degree of matching between identified inputs comprised in operation 210. The social media application system uses the matching results from operation 220, to further adjust the respective viewer a relationship level category. In embodiments, for example, relationship level categories are a summative representation of the degree of familiarity expressed between a select viewer and the broadcaster as determined by the social media application system. The relationship level category is responsible for determine what content is appropriate to display to each respective viewer. Relationship level categories can be represented as degrees of separations comprising classifications including, but not limited to, professional, acquaintance, casual, close, and unrestricted.

A professional relationship level category may indicate 20% of a viewer's plurality of inputs match and/or are within a standard deviation of the broadcaster's inputs, as defined by the broadcaster. In such a relationship category, the classified viewer would receive the strongest strength viewing buffer. For example, if the social media application system were to determine a subscribed viewer comprises a work colleague, the social media application can block the occurrence of work (e.g., content) related language to the colleagues receiving a feed. The method of blocking the occurrence of content language can be further described given the context of FIG. 3.

An acquaintance relationship level category may indicate 40% of a viewer's plurality of inputs match and/or are within a standard deviation of the broadcasters, as defined by the broadcaster. In such a relationship category, the acquaintance viewer may be subjected to a weaker viewing buffer than the professional relationship, however, may still have a scrutinized viewing buffer strength greater than a casual relationship. For example, if the social media application system were to determine a subscribed viewer comprises an acquaintance (e.g. online friend, mutual friend, etc.) who share no history of in-person interactions, the social media application can block the occurrence of personal related language to the acquaintances receiving a feed. The method of blocking the occurrence of content language can be further described given the context of FIG. 3.

A casual relationship level category may indicate 60% of a viewer's plurality of inputs match and/or are within a standard deviation of the broadcasters, as defined by the broadcaster. In such a relationship category, the casual viewer may be subjected to a weaker viewing buffer than the acquaintance relationship, however, may still have a scrutinized viewing buffer strength. For example, if the social media application system were to determine a subscribed viewer comprises a casual viewer (e.g. close friend of a casual friend), the social media application can block the occurrence of generally related sensitive language as necessary. The method of blocking the occurrence of content language can be further described given the context of FIG. 3.

A close relationship level category may indicate 80% of a viewer's plurality of inputs match and/or are within a standard deviation of the broadcaster's inputs, as defined by the broadcaster. In such a relationship category, the close viewer may be subjected to a weaker viewing buffer than the close relationship, however, may still have a scrutinized viewing buffer strength at the broadcaster's discretion. For example, if the social media application system were to determine a subscribed viewer comprises a close viewer (e.g. roommate), the social media application can block the occurrence of likely related sensitive language as necessary. The method of blocking the occurrence of content language can be further described given the context of FIG. 3.

An unrestricted relationship level category may indicate 100% of a viewer's plurality of inputs match and/or are within a standard deviation of the broadcaster's inputs, as defined by the broadcaster. In such relationship category, the unrestricted viewer may be subjected to the weakest viewing buffer or none thereof, however, they may still have a scrutinized viewing buffer strength at the broadcaster's discretion. For example, if the social media application system were to determine a subscribed viewer comprises an unrestricted viewer (e.g. sibling), the social media application may allow all sensitive language as necessary.

It is to be understood that the example degrees of percentage matching in each relationship category discussed above are given by means of example and that other percentages, types of categories and number of categories can vary in different embodiments. The various parameters for the number, type, and percentage matching can be configured according to the preference of the broadcaster in some embodiments. With the overlapping inputs, the relationship level is identified. The relationship level can be used for further operations (e.g., operation 120 of FIG. 1). FIG. 2 is intended to represent the example operations of an example method for identifying a relationship level with a plurality of inputs in accordance with some embodiments of the present disclosure. In some embodiments, however, individual operations can have greater or lesser complexity than shown in FIG. 2, and operations in addition to (or in substitution of) those shown in FIG. 2 can be present. Furthermore, in some embodiments, various operations illustrated in FIG. 2 can have greater, lesser, or different functionality than shown in FIG. 2. Furthermore, in some embodiments, various operations illustrated in FIG. 2 can occur in different orders, if they occur at all.

Figure 3:
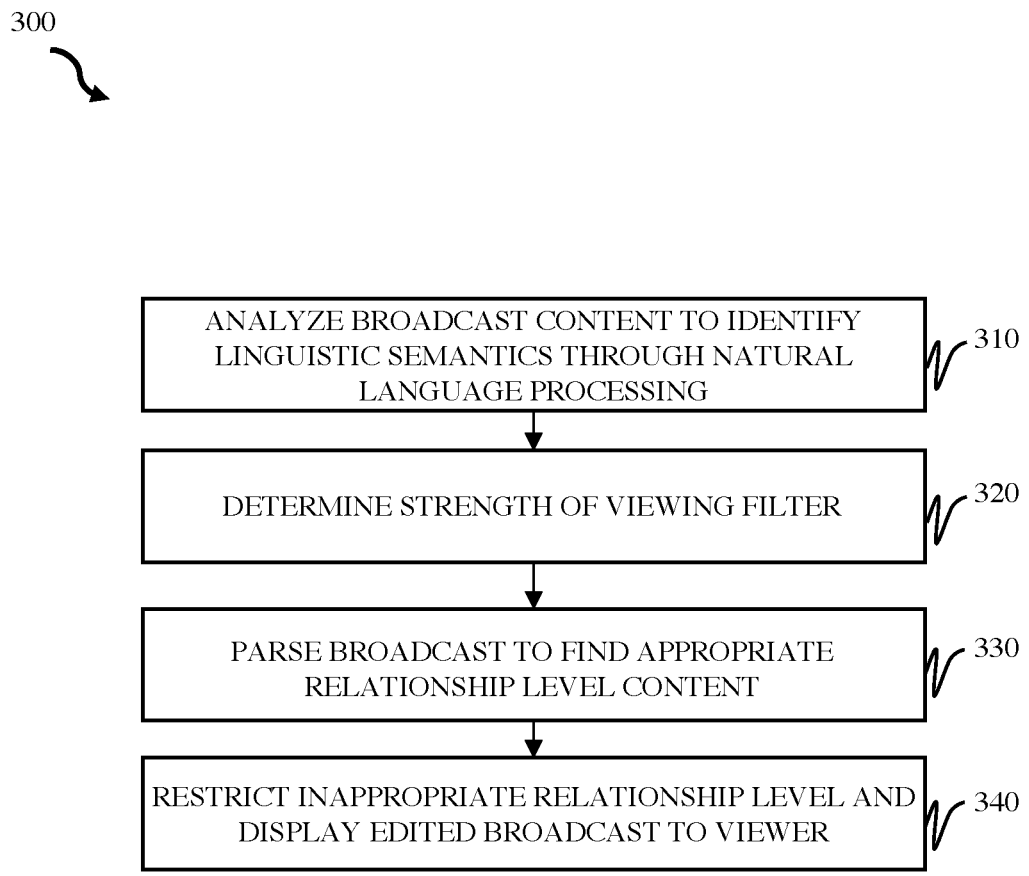
FIG. 3 illustrates a flowchart of an example method for broadcast parsing in accordance with some embodiments of the present disclosure.

Referring to FIG. 3, FIG. 3 illustrates a flowchart of an example method for parsing a broadcast in accordance with some embodiments of the present disclosure. In some embodiments, the method 300 is a sub-method of operation 140 and operation 150 in FIG. 1. In various embodiments, the method 300 can be implemented by one or more processors. The method 300 begins at operation 310 by analyzing the broadcasting content. Broadcasting content can include, but is not limited to, annotations and actions performed (e.g., spoken) by the broadcaster.

In embodiments, a natural language processing system analyzes auditory and visual annotations and linguistic semantics throughout the broadcasting content to identify one or more phrases with associated inappropriate content.

In some embodiments, inappropriate content can be identified with a database comprising a corpus of data relating the vocabulary and phrases. Based on the determined prevalence of inappropriate content, in embodiments, operation 320 determines the strength of a viewing buffer. The strength of the viewing buffer correlates the time delay (e.g., increment of time) a broadcast will be transferred to a particular viewer, based on the relationship level. For example, a viewing buffer can be delayed one minute to eliminate all content deemed inappropriate to the viewer. In such embodiments, for a viewer having a weak buffer or buffer, it could be determined that 30 seconds is enough of a delay whereas for another viewer having a strong buffer, it can determine that two minutes is needed.

Operation 330 parses the broadcaster's broadcast. A parser is a software component that takes spoken input data (e.g., broadcast content) and builds a data structure (e.g., parse tree) or other hierarchical structure to give a structural representation of the broadcast input.

Operation 340 identifies the content, sentiment, and tone of the auditory and visual annotations in the broadcast, so an appropriate relationship level content can be generated. In embodiments, a computer module (or a set of instructions executable by the natural language processor system) can be configured to identify semantic relationships of recognized speech elements (e.g., words, phrases, entities) in received broadcasting content. In some embodiments, the operation 330 can determine functional dependencies between entities and other semantic relationships and further parse non-auditory elements of the broadcast such as gestures. In some embodiments, operation 330 can include an optical character recognition (OCR) to parse written text.

In embodiments, natural language processing occurs to assign semantic relation types to the occurrence of inappropriate language. In some embodiments, operation 330 can be configured to analyze the received content by performing various methods and techniques according to various sets of processor-executable instructions. These sets of processor-executable instructions can include, but are not limited to, generating a parse dependency tree, tagging parts-of-speech (POS), and identifying linguistic roles.

In embodiments, operation 330 can be a computer module (or a set of instructions executable by a natural language processing system) that can be configured to identify dependency grammar of recognized speech elements in received broadcasting content. A parse tree is a hierarchical structure which represents the derivation of the grammar to yield input strings. Further it uses parsing algorithms to plot syntax trees, distinguishing the dependency relation of dependency grammars. A parse tree is compiled by analyzing the grammar and syntax of patient clinical information. The parse tree is then stored until a command of execution to be processed. Further it is constructed to recognize each sentence, taking each word and determining its structure from its constituent parts. In some embodiments, a parse dependency tree can determine functional dependencies between content.

Consistent with various embodiments, the operation 330 can be a computer module (or a set of instructions executable by the natural language processing system) that identifies morphological features of broadcasting content. Operation 330 can determine the part of speech to which a word (or other phrase element) corresponds based on the definition of the word and the context of the word. The context of a word can be based on its relationship with adjacent and related words in a phrase. In some embodiments, the context of a word can be dependent on previously analyzed content. Examples of parts of speech that can be assigned to words include, but are not limited to, noun, verb, article, adjective, preposition, pronoun, and tense for sentences containing relevant annotations. In some embodiments, operation 330 can tag or otherwise annotate passages with parts of speech categories. In some embodiments, operation 330 can tag words of a passage parsed by a natural language processing system.

Consistent with various embodiments, operation 330 can be a computer module (or a set of instructions executable by a natural language processing system) that identifies linguistic role of sentence structures in the broadcasting content. Operation 330 can determine the role of sentence structure to which a word (or other phase element) corresponds based on the definition of the word and the context of the word. The context of a word can be based on its relationship to adjacent and related words in a phrase. In some embodiments, the context of a word can be dependent on previously analyzed content. Examples of roles of sentence structure that can be assigned to words include, but are not limited to, subjects and objects for sentences containing relevant annotations. In some embodiments, operation 330 can identify words of a broadcast parsed by the natural language processing system. In some embodiments, through operation 330, different types or categories of content can be identified for use in restricting content in operation 340.

In operation 340, inappropriate content, deemed by comparing the identified relationship level of the viewer (e.g., operation 120 of FIG. 1) and the content parsed in a natural language parsing system at operation 340 are restricted from viewer access. The content is deleted in the corresponding viewer's feed which is displayed through a viewing buffer comprising an edited broadcast.

In alternative embodiments, the social media application system can enable a notification to the viewer that their current display content is subjected to an increment of time (e.g., seconds) delay with a viewing buffer. The notification can comprise texts, graphics, sounds, and/or other notifications. The viewer can then choose, by pressing the notification, to disable the viewing buffer to override the blocked broadcast such that, the viewing content is unedited and subjected to possible explicit and inappropriate content.

FIG. 3 is intended to represent the example operations of an example method for identifying a relationship level with a plurality of inputs in accordance with some embodiments of the present disclosure. In some embodiments, however, individual operations can have greater or lesser complexity than shown in FIG. 3, and operations in addition to (or in substitution of) those shown in FIG. 3 can be present. Furthermore, in some embodiments, various operations illustrated in FIG. 3 can have greater, lesser, or different functionality than shown in FIG. 3. Furthermore, in some embodiments, various operations illustrated in FIG. 3 can occur in different orders, if they occur at all.

Figure 4:
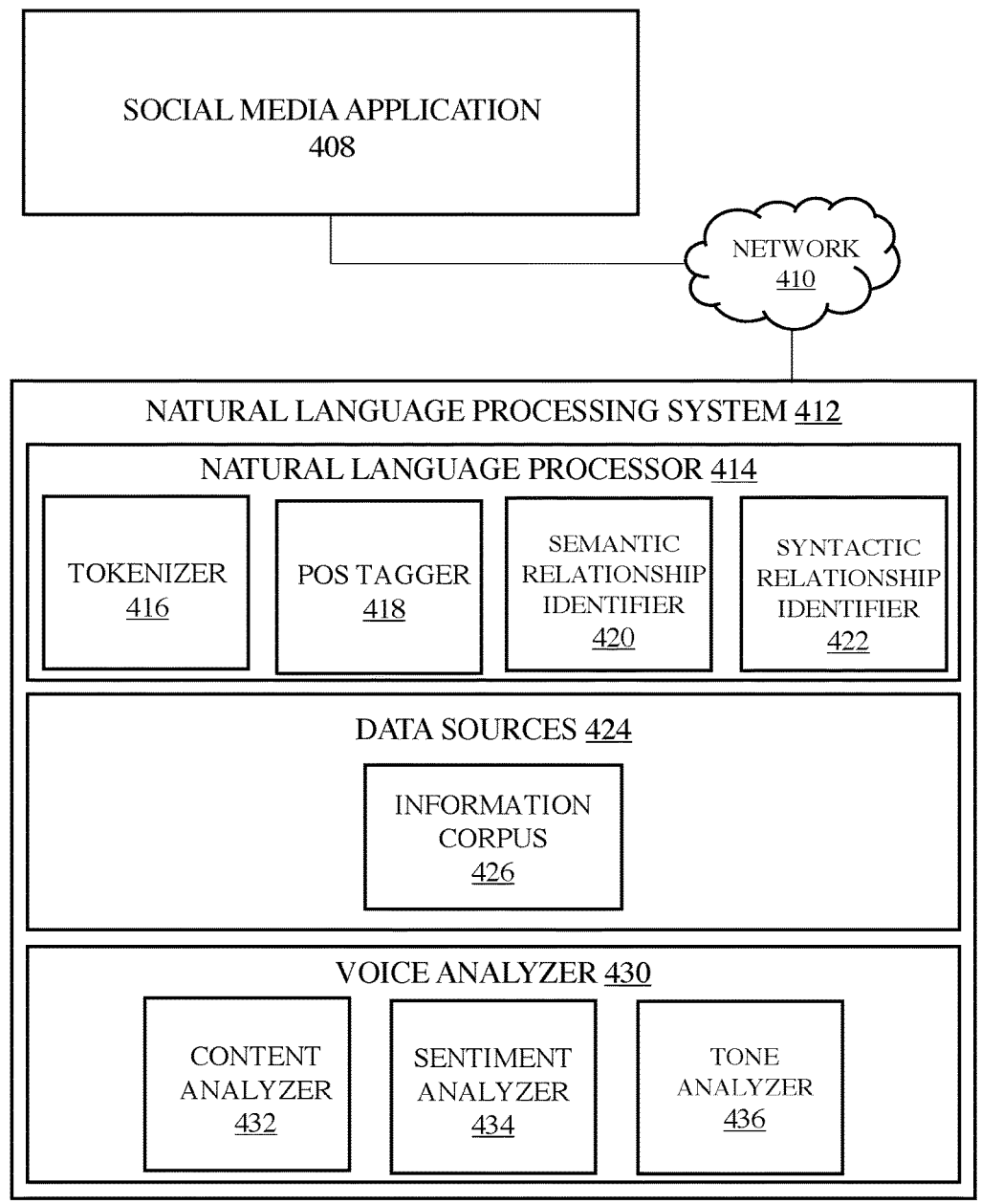
FIG. 4 depicts a block diagram of an example natural language processing system in which embodiments of the present disclosure may be implemented.

Referring to FIG. 4, illustrated is a block diagram of an example natural language processing system configured to analyze one or more inputs (e.g., voice, written, etc.), in accordance with embodiments of the present disclosure. In some embodiments, a live-stream recording device (such as the live-stream recording device in method 100 of FIG. 1) may receive audio and visual data of a broadcaster's broadcast and send the data to be analyzed by the natural language processing system 412 which may be a standalone device, or part of the recording device, or part of a larger computer system. The system 412 can be part of the broadcaster's device, a network device coupled to the broadcaster's device or part of the viewer's device. Such a natural language processing system 412 may include a social media application 408, which may itself record broadcasting content that is then dispatched to a natural language processing system 412 via a network 410.

Consistent with various embodiments, the natural language processing system 412 may respond to broadcasting content transferred by the social media application 408. Specifically, the natural language processing system 412 may analyze a sensitive broadcasting content reflecting inappropriate language and reactions/sentiments associated with the broadcasting topic(s). In some embodiments, the natural language processing system 412 may include a natural language processor 414, data sources 424, and a voice input analyzer 430. The natural language processor 414 may be a computer module that analyzes the transferred broadcast. The natural language processor 414 may perform various methods and techniques for analyzing electronic documents (e.g., content analysis, sentiment analysis, tone analysis etc.). The natural language processor 414 may be configured to recognize and analyze any number of natural languages. In some embodiments, the natural language processor 414 may parse the broadcast. Further, the natural language processor 414 may include various modules to perform analyses of the broadcast. These modules may include, but are not limited to, a tokenizer 416, a part-of-speech (POS) tagger 418, a semantic relationship identifier 420, and a syntactic relationship identifier 422.

In some embodiments, the tokenizer 416 may be a computer module that performs lexical analysis. The tokenizer 416 may convert a sequence of phrases to characters and then into a sequence of tokens. In some embodiments, the tokenizer 416 may identify speech boundaries in a broadcast and separate phrases into their component text elements, such as words, multiword tokens, numbers, and punctuation marks.

Consistent with various embodiments, the POS tagger 418 may be a computer module that corresponds to a particular part of speech. The POS tagger 418 assigns a part of speech to each word or phrase or other token. The POS tagger 418 may determine the part of speech to which a word corresponds, based on the definition of the word and the context of the word. The context of a word may be based on its relationship with adjacent and related words in a phrase, sentence, or paragraph. In embodiments, the output of the natural language processing system 412 may identify the work in a relational database to enhance the contextual interpretation of a word or term. Examples of parts of speech that may be assigned to words include, but are not limited to, nouns, verbs, adjectives, adverbs, and the like. Examples of other part of speech categories that POS tagger 418 may include, but are not limited to, comparative or superlative adverbs, conjunctions, determiners, negative particles, possessive markers, prepositions, and the like. In some embodiments, the POS tagger 418 may tag or otherwise annotate tokens of a broadcast with part of speech categories.

In some embodiments, the semantic relationship identifier 420 may be a computer module that may be configured to identify semantic relationships of recognized recorded elements (e.g., words, phrases). In some embodiments, the semantic relationship identifier 420 may determine functional dependencies between entities and other semantic relationships.

Consistent with various embodiments, the syntactic relationship identifier 422 may be a computer module that may be configured to identify syntactic relationships in a passage composed of tokens. The syntactic relationship identifier 422 may determine the grammatical structure of sentences such as, for example, which groups of words are associated as phrases and which word is the subject or object of a verb. The syntactic relationship identifier 422 may conform to formal grammar.

As used herein, a corpus may refer to one or more data sources. In some embodiments, the data sources 424 may include data warehouses, information corpora, data models, and document repositories. In some embodiments, the data sources 424 may include an information corpus 426. The information corpus 426 may enable inappropriate content (e.g., word) identification and retrieval. In some embodiments, the information corpus 326 may be a storage mechanism that houses a standardized, consistent, clean, and integrated list of inappropriate and sensitive content.

In some embodiments, the voice input analyzer 430 may be a computer module that identifies broadcasting topics. In some embodiments, the voice input analyzer 430 may include a topic analyzer 432, a sentiment analyzer 434, and a tone analyzer 436. When a broadcast is recorded and then received by the natural language processing system 412, the voice input analyzer 430 may be configured to identify, using natural language processing, the occurrence frequency of sensitive content. The voice analyzer 430 may first parse the broadcast using the natural language processor 414 and related subcomponents 416-422. After parsing the conversation, the content analyzer 432 may identify one or more topics present in the conversation.

The sentiment analyzer 434 may determine the sentiment a broadcaster exhibits for a given conversational topic identified by content analyzer 432. The sentiment analyzer 434 may search, using natural language processing and information corpus 426, for words related to sensitive content in the broadcasters broadcast.

The tone analyzer 434 may determine the tone the broadcaster exhibits for a given conversational topic identified by content analyzer 432 and more specifically during the use of sensitive content.

Figure 5:
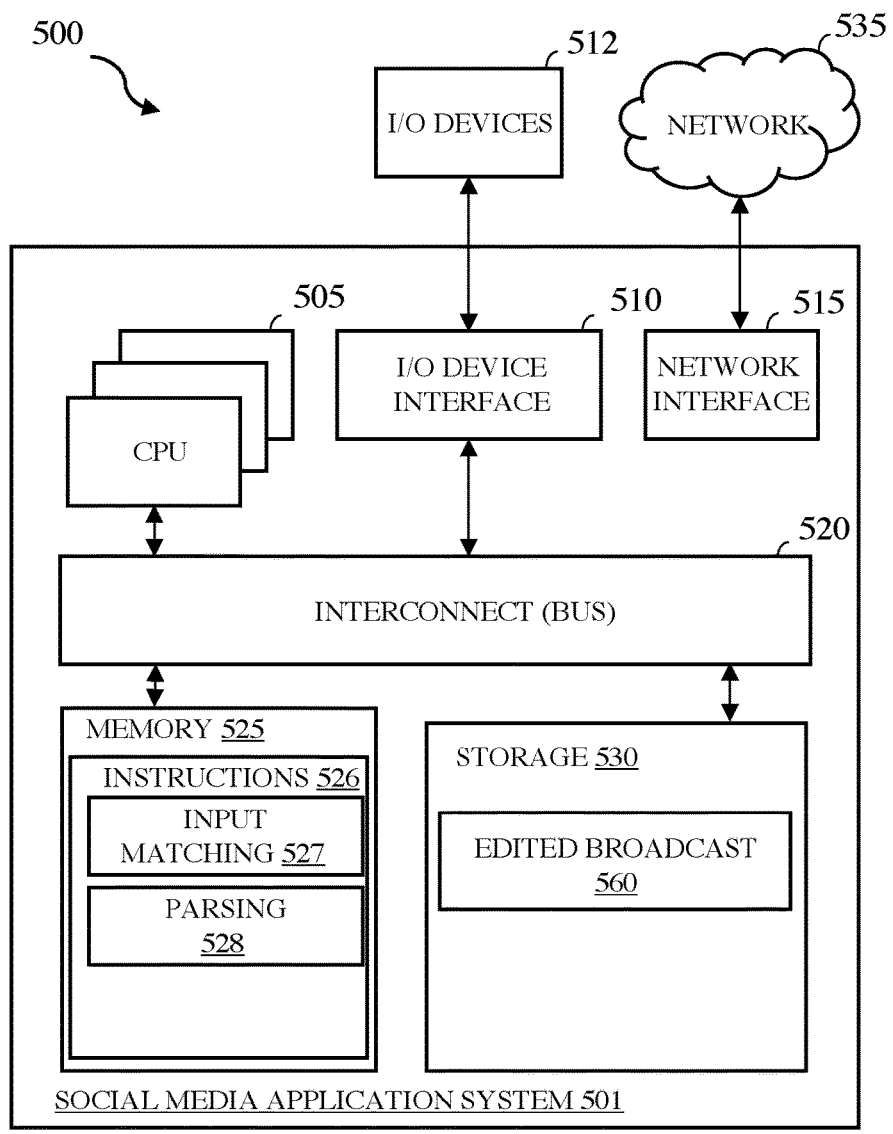
FIG. 5 depicts a block diagram of an example live-stream recording device in accordance with embodiments of the present disclosure.

FIG. 4 is intended to represent an apparatus drawing of a natural language processing system 412 which can perform the example operations of an example method, such as method 300 in FIG. 3, to analyze voice inputs in accordance with some embodiments of the present disclosure. In some embodiments, however, individual components can have greater or lesser complexity than shown in FIG. 4, and components in addition to (or in substitution of) those shown in FIG. 4 can be present. Furthermore, in some embodiments, various components illustrated in FIG. 4 can have greater, lesser, or different functionality than shown in FIG. 4. FIG. 5 illustrates a block diagram of an example live-stream recording device 500 in accordance with some embodiments of the present disclosure. In some embodiments, live-stream recording device 500 can comprise a mobile device or computer and is configured to implement embodiments of one or more of methods 100-300 discussed above in FIGS. 1-3.

The embodiment of live-stream recording device 500 depicted in FIG. 5 includes components comprised in social media application system 501 and more specifically, memory 525, storage 530, an interconnect (e.g., BUS) 520, one or more CPUs 505 (also referred to as processors 705 herein), an I/O device interface 510, I/O devices 512, and a network interface 515. Memory 525 can comprise instructions 526. Instructions 526 can comprise input matching 527 and parsing 528. Storage 530 can comprise edited broadcast 560. In some embodiments, there can be more than one edited version of edited broadcast 560 for the different types of relationships of viewers. Live-stream recording device 500 can further be coupled to a network 535.

Each CPU 505 retrieves and executes programming instructions stored in the memory 525 or storage 530. The interconnect 520 is used to move data, such as programming instructions, between the CPUs 505, I/O device interface 510, storage 530, network interface 515, and memory 525. The interconnect 520 can be implemented using one or more busses. The CPUs 705 can be a single CPU, multiple CPUs, or a single CPU having multiple processing cores in various embodiments. In some embodiments, a CPU 505 can be a digital signal processor (DSP). In some embodiments, CPU 705 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 725 is generally included to be representative of a random access memory (e.g., static random access memory (SRAM), dynamic random access memory (DRAM), or Flash). The storage 530 is generally included to be representative of the cloud or other devices connected to the live-stream recording device 500 via the I/O devices interface 510 or a network 535 via the network interface 515.

In some embodiments, the memory 525 stores instructions 526 and the storage 530 edited broadcast data for situations in which a viewer overrides their adjusted viewing buffer. In embodiments, storage 530 can be a repository residing on highly-replicated backend storage systems distributed geographically across a plurality of I/O devices 512.

Input matching 527 can be consistent with operation 220 of FIG. 2. Parsing 528 can be consistent with operation 140 of FIG. 1.

In various embodiments, the I/O devices 512 include an interface capable of presenting information and receiving input (e.g., a user interface, such as a screen including a touch screen, pointing devices, speakers, etc.).

FIG. 5 represents example components of an example live-stream recording device 500 according to embodiments of the present disclosure. In some embodiments, however, individual components can have greater or lesser complexity than shown in FIG. 5, and components other than, or in addition to those shown in FIG. 5 can be present. Furthermore, in some embodiments, various components illustrated in FIG. 5 can have greater, lesser, or different functionality than shown in FIG. 5.

Figure 6:
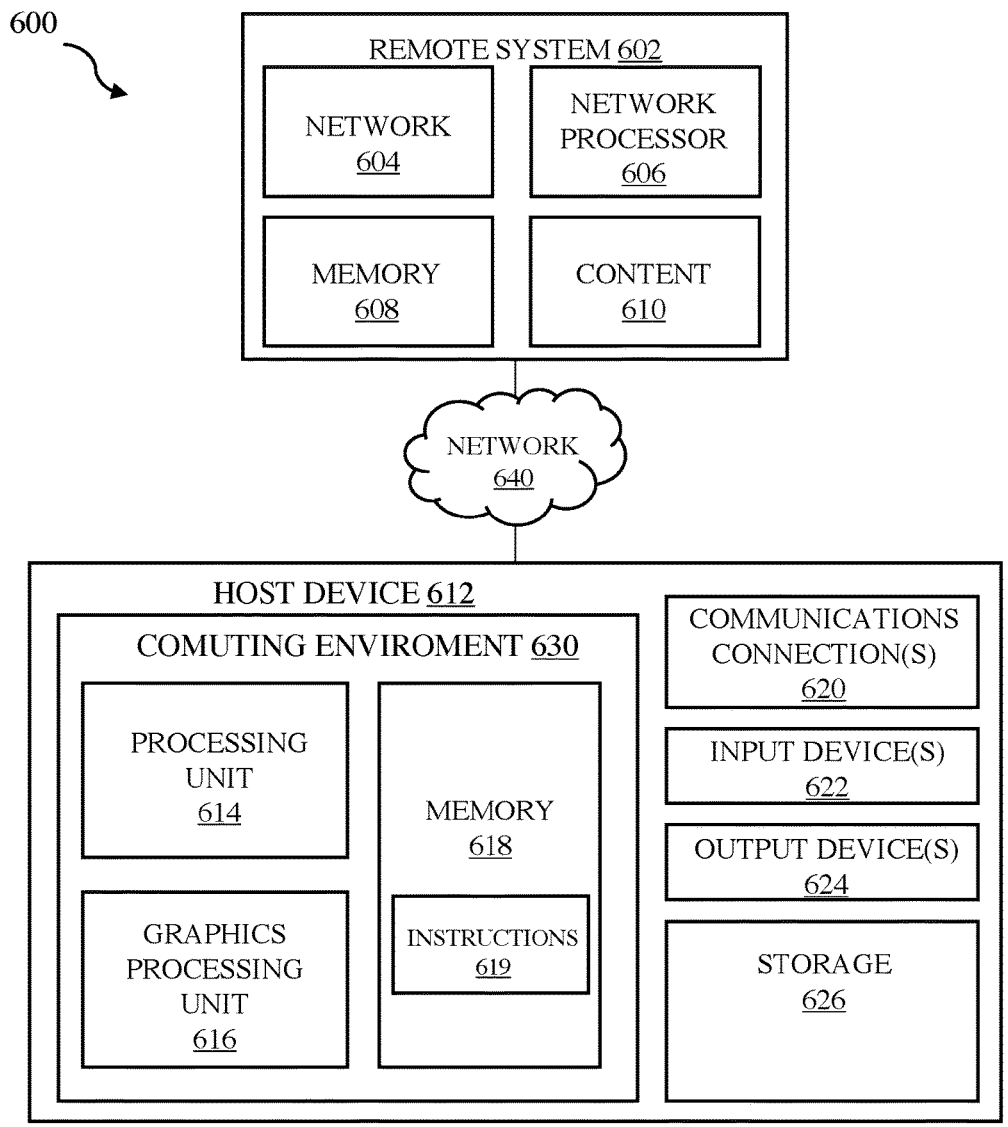
FIG. 6 depicts a block diagram of an example computing environment in which embodiments of the present disclosure may be implemented.

FIG. 6 depicts a block diagram of an example computing environment 600 in which embodiments of the present disclosure can be implemented. In some embodiments, aspects of computing environment 600 can perform the methods described in one or more of FIGS. 1-3. In embodiments, the computing environment 600 can include a remote system 602 and a host device 612.

According to embodiments, the host device 612 can be on live-stream recording devices and the remote system 602 can be on live-stream receiving devices. In embodiments, live-stream refers to a broadcast as it is being recorded as opposed to non-live stream feeds which record the entire broadcast prior to transmitting it. Live-stream can include delay in the transmission or reception of the broadcast, such as through buffering. The remote system 602 and the host device 612 can include one or more processors 606 and 614 and one or more memories 608 and 618, respectively. The remote system 602 and the host device 612 can be configured to communicate with each other through an internal or external network interface 604 and communications connection(s) 620. The remote system 602 and/or the host device 612 can be equipped with a display or monitor. Additionally, the remote device 602 and/or the host device 612 can include optional input devices (e.g., a keyboard, mouse, scanner, or other input device), and/or any commercially available or custom software (e.g., browser software, communications software, server software, natural language processing software, search engine, and/or web crawling software, buffer modules for buffering content based upon predefined parameters, etc.). In some embodiments, the remote system 602 and/or the host device 612 can be servers, desktops, laptops, or hand-held devices.

The remote system 602 and the host device 612 can be distant from each other and can communicate over a network 640. Network 640 can be consistent with network 535 of FIG. 5. In embodiments, the host device 612 can be a central hub from which a remote system 602 and other remote devices (not pictured) can establish a communication connection (e.g., viewing broadcast). In some embodiments, the host device 612 and remote system 602 can be configured in any other suitable network relationship (e.g., in a peer-to-peer configuration or using another network topology).

In embodiments, the network 640 can be implemented using any number of any suitable communications media. For example, the network 640 can be a wide area network (WAN), a local area network (LAN), the Internet, or an intranet. In certain embodiments, the remote system 602 and the host device 612 can be local to each other, and communicate via any appropriate local communication medium. For example, the remote system 602 and the host device 612 can communicate using a local area network (LAN), one or more hardwire connections, a wireless link or router, or an intranet. In some embodiments, the remote system, the host device 612, and any other devices can be communicatively coupled using a combination of one or more networks and/or one or more local connections. For example, the remote system 602 can be hardwired to the host device 612 (e.g., connected with an Ethernet cable) while a second device (not pictured) can communicate with the host device using the network 640 (e.g., over the Internet).

In some embodiments, the network 640 can be implemented within a cloud computing environment, or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 640.

In some embodiments, the remote system 602 can enable a broadcast transmitted from host device 612. In some embodiments, the host device 612 can include input device(s) 624 and output device(s) 626 directly. The host device 612 can contain subcomponents, such as a computing environment 630. The computing environment 630 can include a processing unit 614, a graphics processing unit 616, and a memory 618. Memory 618 comprises instructions 619. In embodiments, instructions 619 can be consistent with instructions 526 of FIG. 5. The computing environment 630 can be configured to perform processing to transfer a broadcast of content 610 from remote system 602.

The storage 626 can be configured to store sensitive language and inappropriate broadcasting content as well as can be connected to memory 618. Storage 628 can be consistent with storage 530 of FIG. 5.

While FIG. 6 illustrates a computing environment 600 with a single host device 612 and a single remote system 602, suitable computing environments for implementing embodiments of this disclosure can include any number of remote devices and host devices. The various models, modules, systems, instructions, and components illustrated in FIG. 6 can exist, if at all, across a plurality of host devices and remote devices.

It is noted that FIG. 6 is intended to depict representative components of an example computing environment 600. In some embodiments, however, individual components can have greater or lesser complexity than as represented in FIG. 6 components other than or in addition to those shown in FIG. 6 can be present, and the number, type, and configuration of such components can vary.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device 7 via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or subset of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing, or otherwise receiving payment for use of the systems.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for censoring viewing content, the method comprising:

sending a notification that viewing content is being recorded by a broadcaster and available for viewing;

identifying one or more viewers that have accepted the notification;

identifying the one or more viewers' relationship level to the broadcaster;

generating a buffer for the one or more viewers, wherein generating comprises;

determining a sensitive content occurrence frequency of the broadcaster; and adjusting the buffer length based on the relationship level for the one or more viewers;

wherein the method further comprises:

parsing the broadcast of the broadcaster to identify sensitive viewing content; and in response to a determination that the sensitive viewing content exceeds the one or more viewers' relationship level, censoring the sensitive viewing content based on the adjusted buffer length of a buffered version of the broadcast transmitted to the one or more viewers.

2. The method of claim 1, wherein identifying a relationship level between the broadcaster and the one or more viewers comprises identifying the relationship level based on a degree of separation within a social network and a comparison of a plurality of personal inputs of the one or more viewers and a plurality of professional inputs of the one or more viewers with a plurality of personal inputs of the broadcaster and with a plurality of professional inputs of the broadcaster, wherein the degree of separation within a social network and the plurality of personal inputs of the one or more viewers and the plurality of professional inputs of the one or more viewers are extracted from at least one viewer profile comprised on one or more social media broadcasting platforms.

3. The method of claim 1, wherein the buffer length delays delivery of the broadcast to the one or more viewers based on the adjusted buffer length, wherein the adjusted buffer length is based on the identified relationship level and the broadcaster's sensitive content occurrence frequency, wherein the buffer length is measured in increments of time.

4. The method of claim 1, further comprising:
receiving user input from the broadcaster which indicates, through a gesture, to retroactively apply the viewing buffer to remove a previous increment of broadcasted content.

5. The method of claim 1, further comprising:
notifying the one or more viewers when the viewing buffer is enabled, wherein the notification can include an increment of time the viewing content is buffered with; and
in response to learning, through one or more completed censorship sequences, the broadcaster's tendency to use sensitive content, pre-adjusting the buffer length prior to a broadcast.

6. The method of claim 1, wherein parsing uses a natural language processor configured to transcribe annotations comprised throughout the duration of the broadcast, wherein the annotations comprise auditory and visual annotations, wherein auditory and visual annotations comprise the content, sentiment, and tone of the broadcaster's broadcast.

7. The method of claim 1, wherein the sensitive viewing content comprises inappropriate language, one or more offensive gestures, and one or more age restricted information.

8. A system for censoring viewing content, the system comprising:
a computer readable storage medium configured to store instructions;
a user interface configured to receive input and present output; and
a processor communicatively coupled to the computer readable storage medium and to the user interface; wherein the processor is configured to execute the instructions to:
send a notification that viewing content is being recorded by a broadcaster and available for viewing;
identify one or more viewers that have accepted the notification;
identify the one or more viewers' relationship level to the broadcaster;
generate a buffer for the one or more viewers, wherein generating comprises:
determining a sensitive content occurrence frequency of the broadcaster; and
adjusting the buffer length based on the relationship level for the one or more viewers;
wherein the processor is configured to execute the instructions to:
parse the broadcast of the broadcaster to identify sensitive viewing content; and
in response to a determination that the sensitive viewing content exceeds the one or more viewers' relationship level, censor the sensitive viewing content based on the adjusted buffer length of a buffered version of the broadcast transmitted to the one or more viewers.

9. The system of claim 8, wherein identifying a relationship level between the broadcaster and the one or more viewers comprises identifying the relationship level based on a degree of separation within a social network and a comparison of a plurality of personal inputs of the one or more viewers and a plurality of professional inputs of the one or more viewers with a plurality of personal inputs of the broadcaster and with a plurality of professional inputs of the broadcaster, wherein the degree of separation within a social network and the plurality of personal inputs of the one or more viewers and the plurality of professional inputs of the one or more viewers are extracted from at least one viewer profile comprised on one or more social media broadcasting platforms.

10. The system of claim 8, wherein the buffer length delays delivery of the broadcast to the one or more viewers based on the adjusted buffer length, wherein the adjusted buffer length is based on the identified relationship level and the broadcaster's sensitive content occurrence frequency, wherein the buffer length is measured in increments of time.

11. The system of claim 8, further comprising:
receiving user input from the broadcaster which indicates, through a gesture, to retroactively apply the viewing buffer to remove a previous increment of broadcasted content.

12. The system of claim 8, further comprising:
notifying the one or more viewers when the viewing buffer is enabled, wherein the notification can include an increment of time the viewing content is buffered with; and
in response to learning, through one or more completed censorship sequences, the broadcaster's tendency to use sensitive content, pre-adjusting the buffer length prior to a broadcast.

13. The system of claim 8, wherein parsing uses a natural language processor configured to transcribe annotations comprised throughout the duration of the broadcast, wherein the annotations comprise auditory and visual annotations, wherein auditory and visual annotations comprise the content, sentiment, and tone of the broadcaster's broadcast.

14. The system of claim 8, wherein the sensitive viewing content comprises inappropriate language, one or more offensive gestures, and one or more age restricted information.

15. A computer program product for censoring viewing content, the computer program product comprising a computer readable storage medium having program instructions embodied therewith, the program instructions executable by a processor to cause the processor to:
send a notification that viewing content is being recorded by a broadcaster and available for viewing;
identify one or more viewers that have accepted the notification;
identify the one or more viewers' relationship level to the broadcaster;
generate a buffer for the one or more viewers, wherein generating comprises:
determining a sensitive content occurrence frequency of the broadcaster; and
adjusting the buffer length based on the relationship level for the one or more viewers;
wherein the processor is configured to execute the instructions to:
parse the broadcast of the broadcaster to identify sensitive viewing content; and
in response to a determination that the sensitive viewing content exceeds the one or more viewers' relationship level, censor the sensitive viewing content based on the adjusted buffer length of a buffered version of the broadcast transmitted to the one or more viewers.

16. The computer program product of claim 15, wherein identifying a relationship level between the broadcaster and the one or more viewers comprises identifying the relationship level based on a degree of separation within a social network and a comparison of a plurality of personal inputs of the one or more viewers and a plurality of professional inputs of the one or more viewers with a plurality of personal inputs of the broadcaster and with a plurality of professional inputs of the broadcaster, wherein the degree of separation within a social network and the plurality of personal inputs of the one or more viewers and the plurality of professional inputs of the one or more viewers are extracted from at least one viewer profile comprised on one or more social media broadcasting platforms.

17. The computer program product of claim 15, wherein the buffer length delays delivery of the broadcast to the one or more viewers based on the adjusted buffer length, wherein the adjusted buffer length is based on the identified relationship level and the broadcaster's sensitive content occurrence frequency, wherein the buffer length is measured in increments of time.

18. The computer program product of claim 15, further comprising:
receiving user input from the broadcaster which indicates, through a gesture, to retroactively apply the viewing buffer to remove a previous increment of broadcasted content.

19. The computer program product of claim 15, further comprising:
notifying the one or more viewers when the viewing buffer is enabled, wherein the notification can include an increment of time the viewing content is buffered with; and in response to learning, through one or more completed censorship sequences, the broadcaster's tendency to use sensitive content, pre-adjusting the buffer length prior to a broadcast.

20. The computer program product of claim 15, wherein parsing uses a natural language processor configured to transcribe annotations comprised throughout the duration of the broadcast, wherein the annotations comprise auditory and visual annotations, wherein auditory and visual annotations comprise the content, sentiment, and tone of the broadcaster's broadcast; wherein the sensitive viewing content comprises inappropriate language, one or more offensive gestures, and one or more age restricted information.

* * * * *